(12) United States Patent
Gaonkar et al.

(10) Patent No.: US 11,340,938 B2
(45) Date of Patent: May 24, 2022

(54) INCREASING THE PERFORMANCE OF CROSS THE FRAME LIVE UPDATES

(71) Applicant: International Business Machines Corporation, Armonk, NY (US)

(72) Inventors: Chetan L. Gaonkar, Bangalore (IN); Sanchita Sinha, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 366 days.

(21) Appl. No.: 16/581,883

(22) Filed: Sep. 25, 2019

(65) Prior Publication Data

US 2021/0089347 A1 Mar. 25, 2021

(51) Int. Cl.
| | | |
|---|---|---|
| G06F 9/46 | (2006.01) | |
| G06F 9/48 | (2006.01) | |
| G06F 9/455 | (2018.01) | |
| G06F 12/1009 | (2016.01) | |
| G06F 8/656 | (2018.01) | |

(52) U.S. Cl.
CPC ............ *G06F 9/4856* (2013.01); *G06F 8/656* (2018.02); *G06F 9/45558* (2013.01); *G06F 12/1009* (2013.01); *G06F 2009/4557* (2013.01); *G06F 2212/151* (2013.01)

(58) Field of Classification Search
CPC .... G06F 9/4856; G06F 8/656; G06F 12/1009; G06F 2009/4557; G06F 2212/151
See application file for complete search history.

(56) References Cited

U.S. PATENT DOCUMENTS

| | | | |
|---|---|---|---|
| 8,019,962 B2 | 9/2011 | Armstrong et al. | |
| 9,928,056 B1 | 3/2018 | Chittigala et al. | |
| 10,768,965 B1* | 9/2020 | Habusha | G06F 9/45558 |
| 2015/0135175 A1* | 5/2015 | Bacher | G06F 9/45558 |
| | | | 718/1 |
| 2016/0314016 A1 | 10/2016 | Ghosh et al. | |
| 2016/0335108 A1 | 11/2016 | Ryu et al. | |
| 2018/0006896 A1 | 1/2018 | MacNamara et al. | |

(Continued)

FOREIGN PATENT DOCUMENTS

CN 101819545 A 9/2010

OTHER PUBLICATIONS

Yang, Yaodong "On Optimizations of Virtual Machine Live Storage Migration for the Cloud", Computer Science and Engineering: Theses, Dissertations, and Student Research, Jul. 2016, pp. 1-134.

(Continued)

*Primary Examiner* — Wissam Rashid
(74) *Attorney, Agent, or Firm* — Cantor Colburn LLP; Kelsey Skodje

(57) ABSTRACT

Provided are embodiments of a method for performing live updates. The method includes determining a migration type for a live migration to be performed from a source server to a target server, and performing the live migration from the source server to the target server. The method also includes based on the migration type, maintaining pages to be migrated, tracking modifications in a hypervisor page table, and performing a back-migration based on the migration type. Also provided are embodiments for a system and computer program product for performing live updates.

18 Claims, 10 Drawing Sheets

(56) References Cited

U.S. PATENT DOCUMENTS

| | | |
|---|---|---|
| 2018/0018163 A1 | 1/2018 | Goetz et al. |
| 2018/0088975 A1 | 3/2018 | Kaul |
| 2019/0163644 A1* | 5/2019 | Jayasena ............... G06F 12/128 |
| 2020/0042340 A1* | 2/2020 | Wiggers ............... G06F 9/4856 |

OTHER PUBLICATIONS

Mell et al., "The NIST Definition of Cloud Computing", NIST, U.S. Department of Commerce, Special Publication 300-145, Sep. 2011, 7 pages.

International Search Report; International Application No. PCT/IB2020/058880; International Filing Date: Sep. 23, 2020; dated Jan. 15, 2021; 9 pages.

* cited by examiner

INCREASING THE PERFORMANCE OF CROSS THE FRAME LIVE UPDATES

BACKGROUND

The present invention relates to data migration, and more specifically, to enhance the efficiency of cross the frame live updates.

Virtualization as a technology aims to interject a layer between the hardware platform and operating system and executing applications. From the perspective of business continuity and disaster recovery, virtualization provides the inherent advantage of environment portability. Specifically, to move an entire environment configured with multiple different applications is a matter of moving a virtual image from one supporting hardware platform to another. Further, more powerful computing environments can support the coexistence of multiple different virtual images, all the while maintaining a virtual separation between the images. Consequently, a failure condition in one virtual image cannot jeopardize the integrity of other co-executing virtual images in the same hardware platform.

A virtual machine monitor, known in the art as a "hypervisor", manages the interaction between each virtual image and the underlying resources provided by the hardware platform.

In this regard, a bare metal hypervisor runs directly on the hardware platform much as an operating system runs directly on hardware. By comparison, a hosted hypervisor runs within a host operating system. In either case, the hypervisor can support the operation of different "guest operating system images"—known as virtual machine (VM) images—the number of VM images being limited only by the processing resources of a VM container holding the VM images or the hardware platform itself.

Virtualization has proven especially useful for those end users requiring separate computing environments for different types of applications while being limited to a single hardware platform. For instance, it is well known for a primary operating system native to one type of hardware platform to provide a virtualized guest operating system native to a different hardware platform so that applications requiring the presence of the guest operating system can co-exist with other applications requiring the presence of the primary operating system. In this way, the end user need not provide separate computing environments each to support a different type of application. Yet, no matter the guest operating system, access to underlying resources of the single hardware platform remains static.

Virtualized environments have been deployed to aggregate different interdependent applications in different VMs in composing an applications solution. For instance, an application server can execute within one VM while a database management system can execute in a different VM and further while a Web server can execute in yet another VM. Each VM can be communicatively coupled to one another in a secure network, however, any given one of deployment of the applications can be live migrated to a different deployment without interfering with the execution of the other applications in the other VMs. In a typical live migration, a VM can be moved from one host server to another in order to permit server maintenance or to permit an improvement in hardware support for the VM. Accordingly, live migration can prove to be a time-consuming process.

SUMMARY

Embodiments of the present invention are directed to a computer-implemented method for improved efficiency of cross the frame live updates. A non-limiting example of the computer-implemented method includes determining a migration type for a live migration to be performed from a source server to a target server, and performing the live migration from the source server to the target server. The computer-implemented method also includes based on the migration type, maintaining pages to be migrated, tracking modifications in a hypervisor page table, and performing a back-migration based on the migration type.

Embodiments of the present invention are directed to a system for improved efficiency of cross the frame live updates. A non-limiting example of the system includes one or more processors, and at least one memory coupled to the one or more processors. The one or more processors are configured to determine a migration type for a live migration to be performed from a source server to a target server, and perform the live migration from the source server to the target server. The one or more processors are also configured to based on the migration type, maintain pages to be migrated, track modifications in a hypervisor page table, and perform a back-migration based on the migration type.

Embodiments of the invention are directed to a computer program product for improved efficiency of cross the frame live updates, the computer program product comprising a computer-readable storage medium having program instructions embodied therewith. The program instructions are executable by a processor to cause the processor to perform a method. A non-limiting example of the method includes determining a migration type for a live migration to be performed from a source server to a target server, and performing the live migration from the source server to the target server. The computer-implemented method also includes based on the migration type, maintaining pages to be migrated, tracking modifications in a hypervisor page table, and performing a back-migration based on the migration type.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
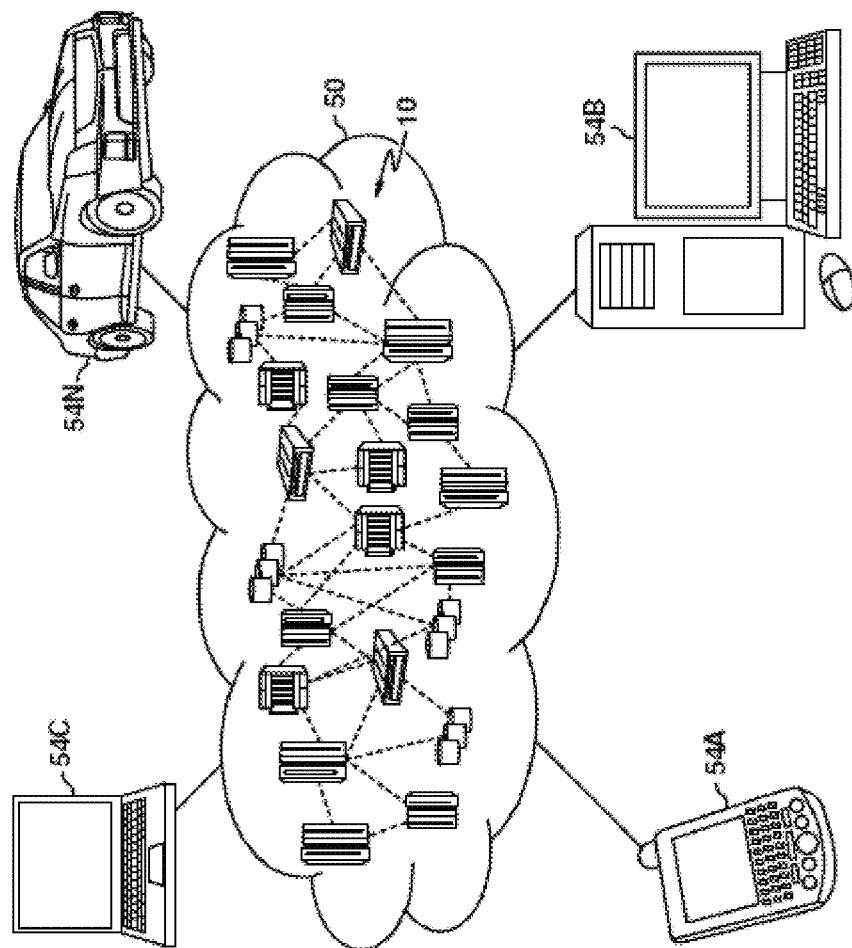
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
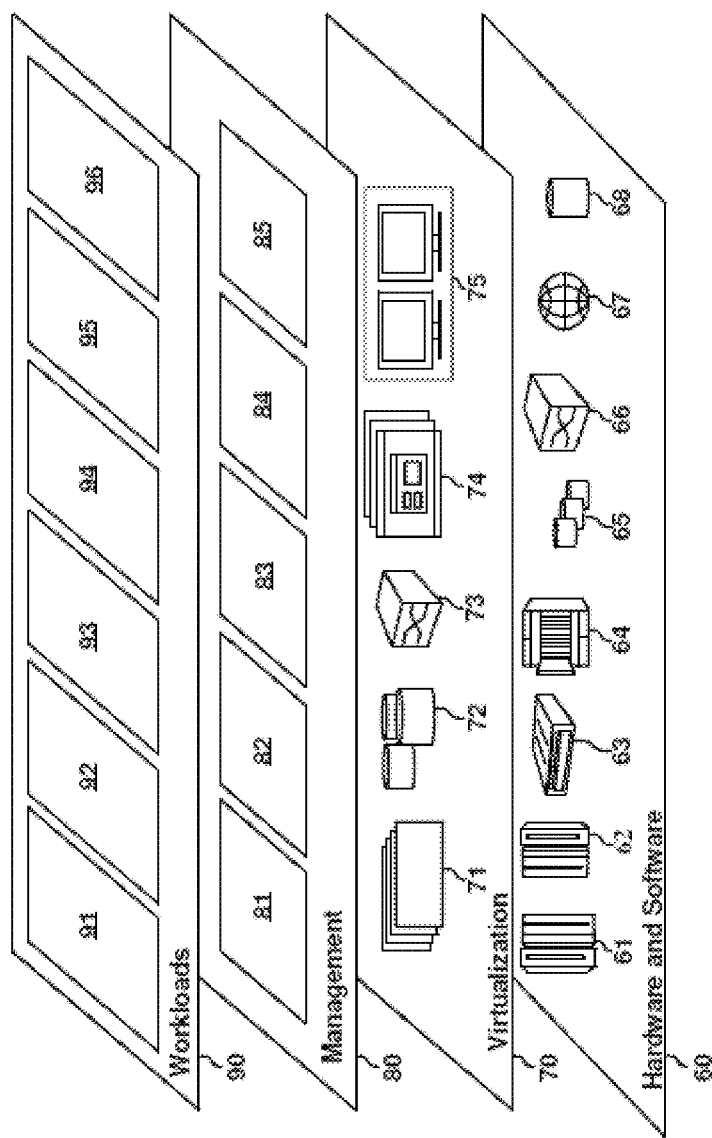
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Turning now to an overview of technologies that are more specifically relevant to aspects of the invention, servers at times perform migration for various reasons. Live migrations allow customers to maintain operations during the migration process thus avoiding application downtime.

In order to implement the Live Update, an additional surrogate LPAR with the same amount of system resources as the original is created. All of the processes and associated resources are transferred from the original to the surrogate LPAR at the end of the Live Update operation. On certain occasions, for packed servers there might be challenges faced due to limited or a shortage of resources to accommodate both the surrogate and original LPAR during the Live Update operation. To overcome this limitation, the Live Update has the capability to migrate the VM (which needs to undergo an update) to a different server (target server) having enough processor and memory resources. The Live Update is performed on the target server. After completion of the Live Update, a back migration is performed to the hosting server.

Live Partition Mobility (LPM) provides the ability to move the logical partition (LPAR) or virtual machine (VM) from one server to another without disrupting the infrastructure services and workload. The hypervisor of the system in collaboration with the Moving Service Partition (MSP) manages the activities of migrating the memory pages of the LPAR/VM from one system to another. There are different migration types including a temporary and permanent migration process. The temporary migration moves the logical partition to a different location or server for a period of time and then returns the logical partition to the source location or server. The permanent migration has no intention of returning to the source server or location.

The Live Update has the capability to migrate the VM (which needs to undergo the update) to a different server (target server) having enough processor and memory resources. The live update is performed on the target server. After completion of the live update a back migration to the hosting serving is performed.

Live Update performs a live migration to an alternate server, performs a live update operation at the target server, and performs a subsequent migration back to the hosting or source server. Since moving across servers include the LPM operation, it adds on the additional time consumption by the Live Update, thus increasing the overall live update operation time.

The LPM operation performed during the Live Update is only temporary migration as the LPAR/VM comes back to its original hosting server once the Live Update operation is completed. The LPM/Live Migration to and from memory is not considered as a temporary movement. The to and from movement (two-time LMP) results in performance degradation of the Live Update. Currently, there are no existing techniques in the hypervisor to track the state of the migrated pages. Hence, it transfers all of the memory pages irrespective of if the pages are updated or not during the LPM.

In other words, the page memory is not maintained during the temporary migration and the complete page memory must be transferred back to the source hypervisor when a temporary migration is performed. That is, a permanent migration and temporary are treated the same. This causes an increased delay in the back-migration process because even those pages that were not modified are transferred back to the source server.

Turning now to an overview of the aspects of the invention, one or more embodiments of the invention address the above-described shortcomings of the prior art by providing techniques that are described herein improve the memory page transfer operation time by selecting only those memory pages which are written/updated after the first LPM.

The above-described aspects of the invention address the shortcomings of the prior art by using an additional field that can be introduced into the hypervisor page table which operates as a flag (modification after migration bit). The logical page number can be the same for the pre and post LVM. The LU makes a note of this additional field by seeing the page table. While performing the back migration, the system will only transfer the pages for which the modification-after-migration flag is set.

The hypervisor needs to be made aware of this additional field since it will be responsible for the virtual to physical page mapping. It will only refer to physical page mapping. It will only refer to physical pages for the logical pages whose flag bit is set. This should reduce the overall memory page transfer time. This additional field can be addressed as the modification-after-migration bit (MAM) bit.

Figure 3:
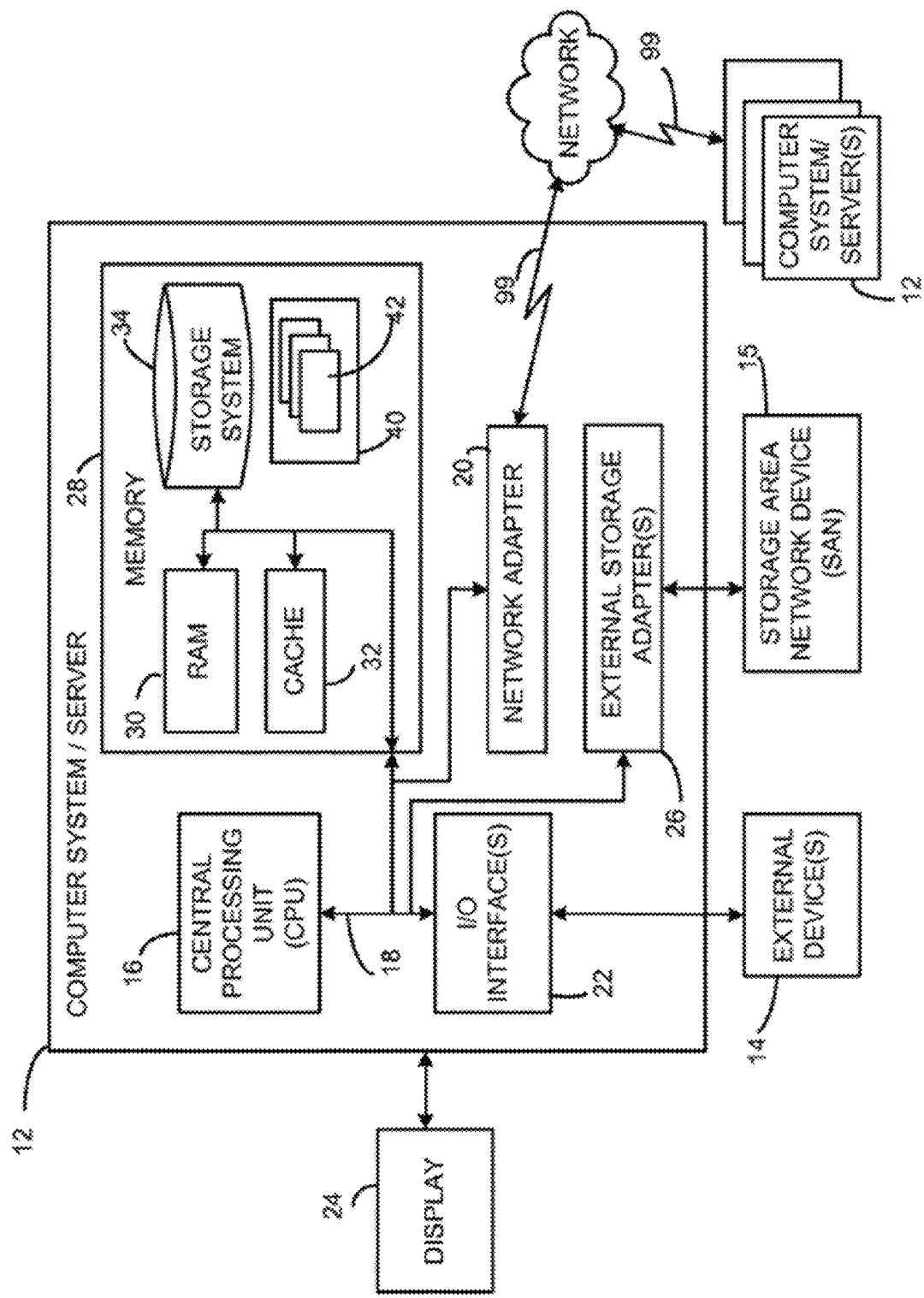
FIG. 3 illustrates a block diagram of a computer system for use in practicing the teachings herein.

Turning now to a more detailed description of aspects of the present invention, FIG. 3 illustrates a block diagram of an exemplary computer system (i.e., server) 12 operable for various embodiments of the disclosure. As shown, the server 12 is only one example of a suitable computer for migrating a logical partition (LPAR) from one machine to another and is not intended to suggest any limitation as to the scope of use or functionality of embodiments of the disclosure described herein.

The server 12 is operational in numerous other computing system environments or configurations. For example, the server 12 may be a virtual partition on a physical host, a clustered server environment, or a distributed cloud computing environment that include any of the above systems, and the like. When practiced in a distributed cloud computing environment, tasks may be performed by both local and remote servers 12 that are linked together and communicate through a communications network, such as the network 99. In an embodiment of the present invention, the local and remote servers 12 may be referred to as the source and target servers for live operating system migrations. Additionally, an embodiment of the server 12 includes a standalone machine control point, also referred to as a hardware management console (HMC), acting as the coordinator for the inventory validation and live operating system migrations. In another embodiment, the server 12 may include a systems management appliance configured to provide a single focal point for systems management, including hardware configuration, and software, hardware, and network management in a multi-node or multi-server environment. Another embodiment of the server 12 includes the virtual I/O server (VIOS), also referred to as a virtualization manager, which hosts the virtual machines, also referred to as logical partitions (LPAR) or clients, manages the virtualization of the physical hardware resources, and participates in the live operating system migration.

The server 12 may be described in the context of executable instructions, such as a program, or more specifically, an operating system (OS) 40 that is an aggregate of program modules 42, components, objects, logic, or data structures, for example, being executed by the processing unit 16 to control the operation of the server 12. Inventory validation and live operating system migration may be implemented as program modules 42 or as extensions to the OS 40. At least a portion of the OS 40 may be specialized to execute the algorithm of FIGS. 3-4.

Each participating server 12 is under the control of an OS 40 residing on each local and remote server 12, respectively. Each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

The components of the server 12 may include, but are not limited to, one or more processors or processing units 16, a system memory 28, and a bus 18 that couples various system components, such as the system memory 28, to the processing unit 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22.

The server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18. However, in a multi-tenant datacenter (MTD) environment, such as a cloud computing environment, network communications may be routed through the member servers 12 and virtual machines through both physical devices (e.g., network adapters network switches), and virtualized networks, such as those implemented using software-defined networking (SDN).

External storage adapter 26 connects the server 12 with external storage subsystems, such as a storage area network (SAN) 15. For a live operating system migration, also referred to as a mobility event or live partition mobility, the source, and target servers share a connection to the SAN 15. The migrating virtual machine also has a virtual connection to the SAN 15 through the source physical computer. Exemplary external storage adapters 26 include, but are not limited to, a host bus adapter (HBA) also referred to a Fibre Channel, host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to microcode, device drivers, redundant processing units, external disk drive arrays, tape drives, and data archival storage systems, etc.

Figure 4:
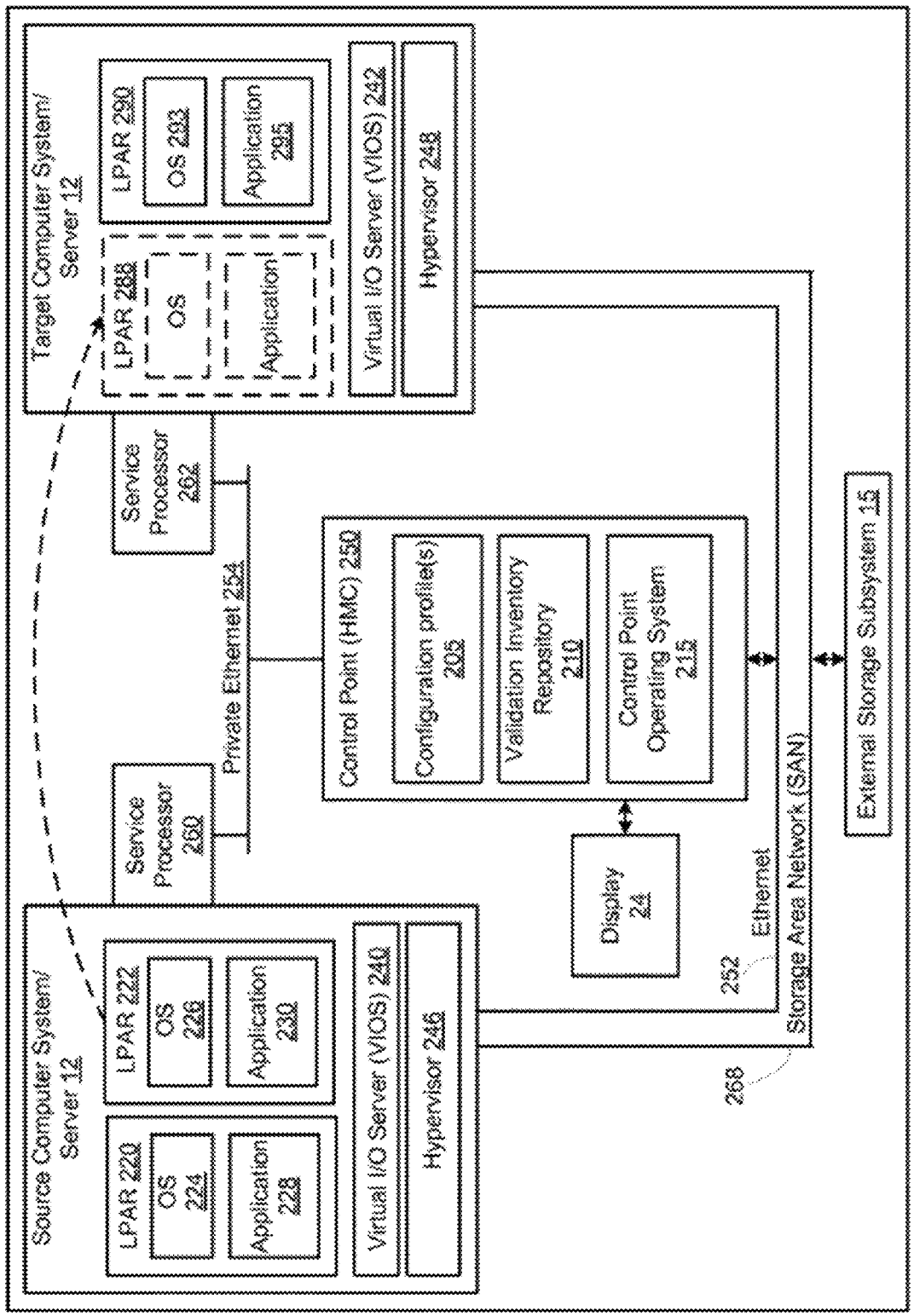
FIG. 4 depicts another system in accordance with one or more embodiments of the invention.

FIG. 4 illustrates a system for reducing redundant validations for live operating system migration. The embodiment includes a source and a target server systems 12. Source server system 12 includes LPARs 220 and 222, although a greater or fewer number of LPARs may be provisioned. LPARs are assigned a subset of a computer's physical hardware resources (i.e., a subset of the hardware underlying the server environment) and are virtualized within the server environment as a separate computer/virtual machine. Resources such as processor capacity, virtual and physical I/O devices, memory, or any other type of resource may be assigned to a particular LPAR. Each LPAR has its own operating system instance (e.g., OS 224, 226 and 293), application programs (e.g., application(s) 228, 230, and 295) and/or associated files, allowing for multiple virtual environments to be simultaneously executing within the server environment.

Specialized LPARs 240 and 242 are dedicated to implementing I/O functionality by executing VIOS software/firmware (software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system)). Logical partitioning, including the virtualization of the physical hardware resources, is facilitated by software/firmware hypervisor 246 and 248. The hypervisor 246/248 coordinates with the VIOS 240/242 and the control point 250 to control and monitor the state and operations of the server system 12 hardware and software, including the operating systems of the LPARs. The hypervisor 246/248 may run directly on the computer system's hardware, may be combined with the VIOS, or may run within a conventional operating system environment, depending upon the implementation.

The control point 250 performs system server and LPAR management in cooperation with the VIOS 240/242 and the hypervisor 246/248. The control point 250, or portions thereof, may be implemented in any suitable manner using known techniques that may be hardware-based, software-based, or some combination of both. For example, the control point 250 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In an alternate embodiment, the portions of the control point operation system 215 that manage LPAR profiles, perform LPAR operations (i.e., activate, deactivate, update), and perform inventory validation may be incorporated into the VIOS 240/242 operating system. Inventory validation, configuration profile management, and LPAR migration operations may be performed from the VIOS 240/242 and/or the control point 250. For example, in some embodiments, the display 24 of the control point 250 may be used to display, for selection by the user/administrator, various configuration profile 205 and validation inventory 210 data that may be available for selection for a mobility event. The selected information may be communicated from the control point 250 to VIOS LPAR 240 and/or 242.

The control point 250 includes a repository of configuration profiles 205. Each LPAR is associated with at least one profile that defines, among other parameters, the portion of the system server 12 hardware resources allocated to the LPAR, an indication of priority for receiving excess system resources, and an operating system environment. The configuration profile 205 includes the LPAR's virtual and physical I/O device configuration. The control point 250 includes a validation inventory repository 210. Each LPAR is associated with a validation inventory in the validation inventory repository 210. The LPAR's validation inventory may include a unique LPAR identifier, the mobility event source, and target server systems, the LPAR's resources according to the LPAR's configuration profile 205, and an indication of whether the pre-migration validation passed or failed for the previous mobility event attempt. The validation inventory repository 210 may be cached on the control point 250. As part of the process of activating an LPAR the control point 250 locates, in the validation inventory repository 210, the validation inventory from the LPAR's previous validation and sends it to the VIOS 240/242 on the server system where the LPAR is defined. The VIOS 240/242 monitors the LPAR for configuration changes that may result in the validation inventory being invalidated, thereby requiring a full validation prior to a subsequent mobility event. The control point 250 may take one or more actions to respond to a notification of invalidity of the LPAR's validation inventory from the VIOS 240/242. For example, the control point 250 may note that a full validation is required for the LPAR upon the next mobility event. In another embodiment, the control point 250 may upon receiving the notification, initiate a full validation and cache the results in advance of the next mobility event. In a further embodiment, the control point 250 may initiate a partial validation for the newly modified, added or removed resource. As shown, the same control point 250 manages both the source and target server systems 12. However, different control points 250 can manage the source and target server systems 12, for example, when the source and target server systems 12 are geographically separated.

In the embodiment illustrated in FIG. 2, LPAR 222 is migrating from source server system 12 to target server system 12. LPAR 288 does not exist on the target server system 12, but will be dynamically created as part of the migration. While migration can be performed while an LPAR is not active, the various embodiments herein particularly apply to migrating executing workloads. LPARs can be migrated between different hardware platforms, and multiple LPARs may be migrated serially or concurrently. The transfer or migration of LPAR 222 from source server system 12 to target server system 12 is coordinated by the control point 250, with the cooperation of the hypervisors 246 and 248, and with the VIOS 240 and 242 acting as agents.

The configuration for a migration environment includes at least one physical HBA configured in each of the source and target VIOS 240/242. These physical HBAs are configured to access the same logical unit numbers (LUNs), i.e., physical disk volumes, on the external storage subsystem 15 that is connected to the SAN 268. Each physical HBA is associated with one or more virtual Fibre Channel (VFC) adapters in each VIOS 240/242. LPAR 222 is configured with one or more VFC adapters from VIOS 240. During the mobility event, one or more additional VFC adapters are created on the target LPAR 288. During migration the LPAR's 222 memory pages are copied asynchronously from the source system server 12 to the target system server 12, and LPARs 222 and 288 maintain uninterrupted access to running applications.

The VFC adapters may implement N_Port ID Virtualization (NPIV) technology. A VFC adapter that implements NPIV technology may also be referred to as a NPIV adapter. NPIV allows a single HBA, referred to an N_Port in NPIV, to register multiple World Wide Port Names (WWPNs) and N_Port identification numbers. A WWPN uniquely identifies an endpoint on a SAN. Each VFC adapter is assigned a pair of WWPNs for accessing the LPAR's LUNs on the external storage subsystem 15. During the mobility event, migrating LPAR 222 uses one WWPN for a connection through VIOS 240 and one for the connection through VIOS 242. During migration, LPAR 222 is briefly active on both the source and target server systems 12 while the LPAR's 222 memory pages are being transferred. Therefore, the pair of WWPNs maintains the unique endpoint identity, as required by connections to a SAN 268.

The VIOS 240 may continue the mobility event without validation if the LPAR's validation inventory is marked as passed and has not changed since the LPAR's activation. Therefore, unnecessary validation checks may be avoided, reducing migration time. The source and target VIOS s 240 and 242 communicate with each other over the public network 252 and/or the private network 254 through the service processors 260/262. The control point 250 creates the target LPAR 288 on the target server system 12, using both the contents of the validation inventory from LPAR 288 and configuration profile 205. The source hypervisor 246 sends and tracks the memory pages from source LPAR 222, thereby enabling the migrating LPAR 222 to continue to run during the mobility event.

Figure 5:
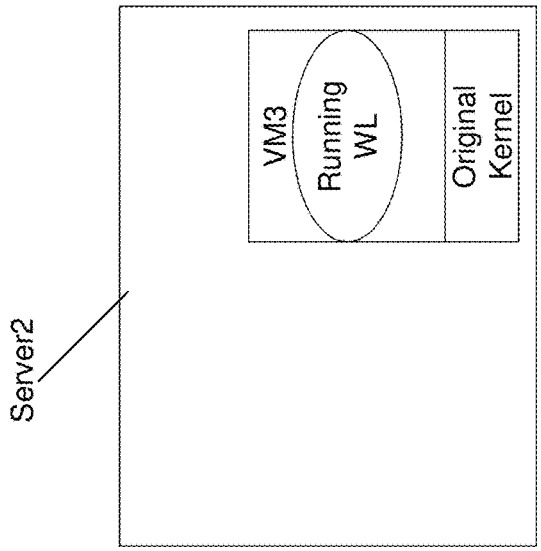
FIG. 5 depicts a migration from a first server to a second server in accordance with one or more embodiments of the invention.
Figure 5:
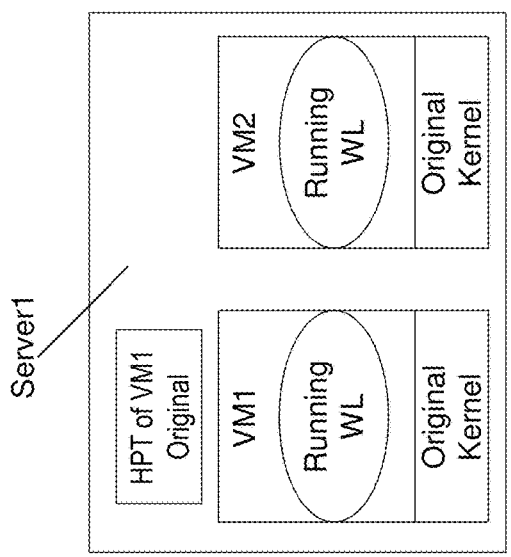

Now referring to FIG. 5 a system for performing a cross frame live update in accordance with one or more embodiments is shown. As shown in FIG. 5, a first server (Server1) includes a first virtual machine (VM1) and a second virtual machine (VM2). The VM1 is currently running a workload and an original kernel, and the VM2 is also running a workload and an original kernel. Also coupled to the VM1 a hypervisor table of VM1 is stored in the server as shown.

It should be understood that any number of VMs can be run on the Server1 and is not limited by the example shown in FIG. 5.

In this illustrative example, a second server (Server2) includes a VM3 which is also running a workload and original kernel. The Server2 can be selected as a target or destination for the migration. The migration can include a permanent migration or a temporary migration.

Figure 6:
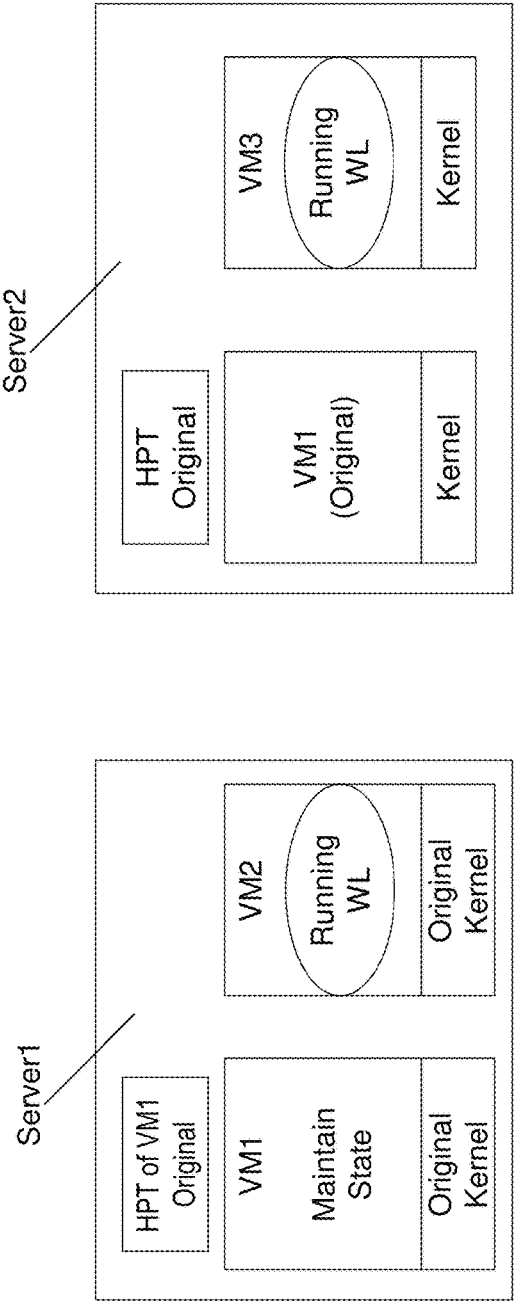
FIG. 6 depicts a state of the system in accordance with one or more embodiments of the invention.

As shown in FIG. 6, the migration process has started and the original HPT of VM1 is stored in the Server2. If a temporary migration is performed, the Server1 retains the state of the HPT, the MSP state is retained, and the OS/VM state is retained. On the other hand, if a permanent migration is performed the states are not maintained by the Server1. Conventional techniques delete the source-side/host-side state information after migration to free up and release the resources.

For the temporary migration, the HPT of VM1 in the Server2 is configured to track changes that occur during the migration process. A bit is used to indicate which changes have occurred. The modification after migration bit maintained in the HPT on Server2 (hypervisor page table of VM1 (original in server2). In one or more embodiments of the invention, the MAM bits are set to "1" for those entries modified due to the LPM.

Figure 7:
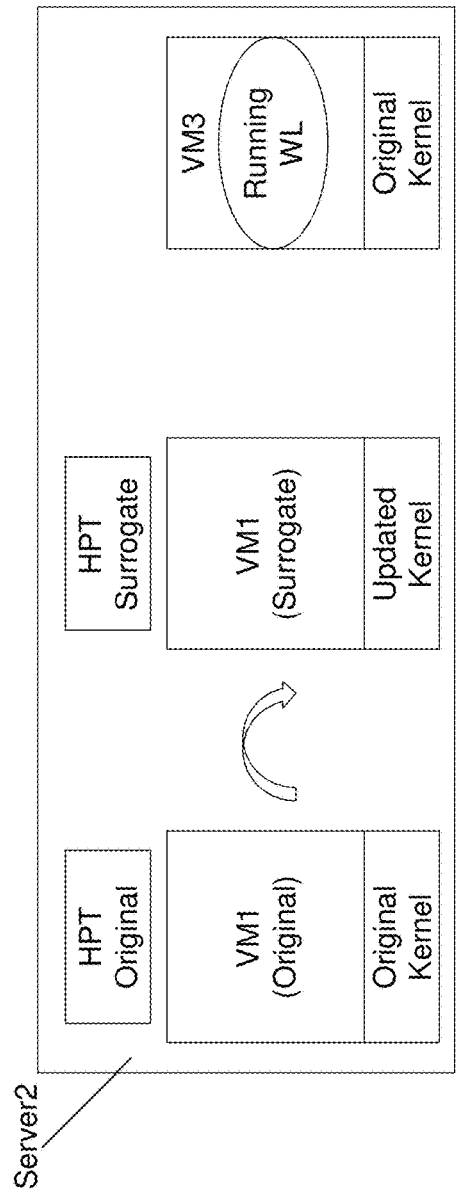
FIG. 7 depicts a state of the system in accordance with one or more embodiments of the invention.

FIG. 7 depicts the target Server2 that includes the surrogate LPAR, HPT, and the updated kernel that reside on the Server2. After the migration has been completed, the workload is transferred to the surrogate HPT (VM1 surrogate node) and the kernel is updated. Similar to the HPT of the original, the surrogate HPT also tracks the changes to the memory pages during the kernel update using the MAM bit.

After the update is completed, the HPT of the surrogate LPAR is searched to identify those pages that have changed during the migration and kernel update. Those pages are prepared for the back-migration process to the Server1 and combined with the retained state data of the original LPAR to provide a complete instance of the LPAR. In one or more embodiments of the invention, only the changes are transmitted back to the source which provides substantial time savings during the process. As the process is implemented, it should be understood that there is no interruption to the processes run on VM1, VM2, or VM3.

Figure 8:
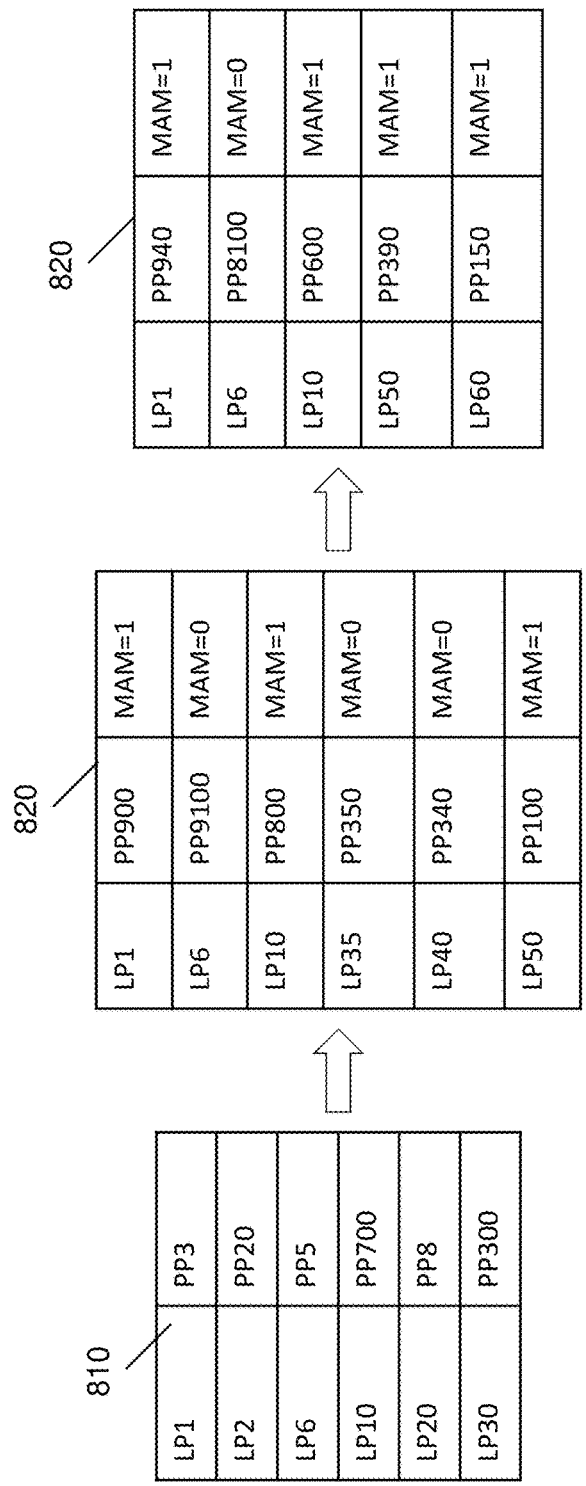
FIG. 8 depicts hypervisor tables including the migration-after-migration bit during the migration process described herein in accordance with one or more embodiments of the invention.

Now referring to FIG. 8, a table 800 storing the MAM bits in accordance with one or more embodiments of the invention is shown. As discussed in the examples above, the MAM bits are stored in the hypervisor page tables of the original and surrogate nodes of server2. FIG. 8 depicts a first hypervisor table 810 stored in the HPT of VM1 on Server1. The HPT of VM1 is stored in the Server1 and maps the logical addresses (LP) to the physical addresses (PP). FIG. 8 also depicts a second hypervisor table 820 which includes a copy of the HPT of VM1 and is stored in Server2. In one or more embodiments of the invention, the MAM bits are set as 1 for those pages modified during the LPM. FIG. 8 depicts a third hypervisor table 830 which includes an HPT of VM1 (surrogate) that is stored in server2. In one or more embodiments of the invention, the MAM bits are set as 1 for those modified due to the live update (LU).

Figure 9:
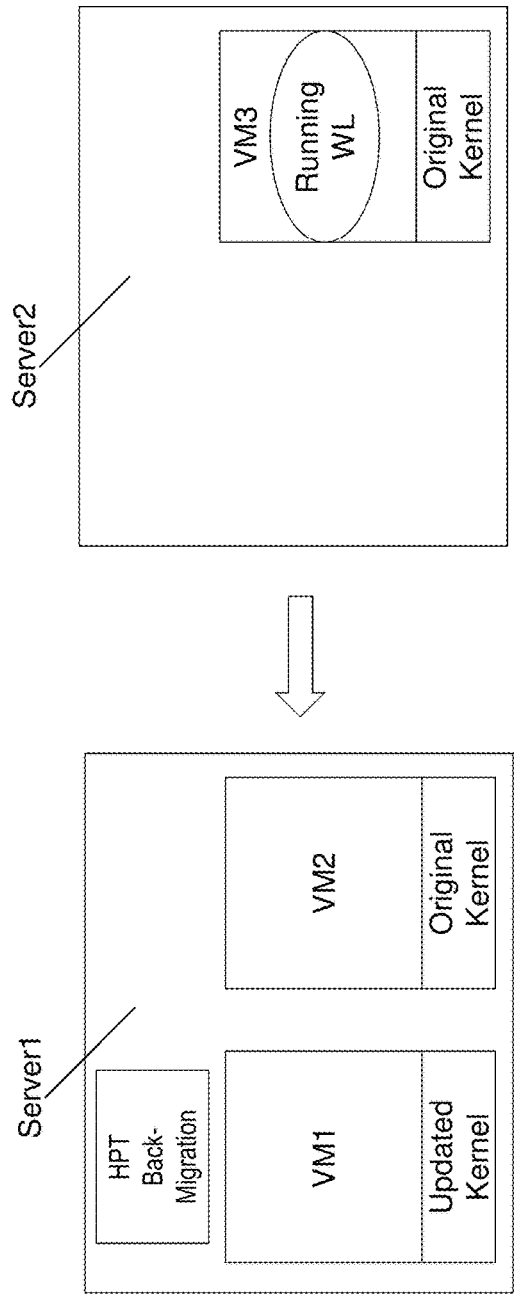
FIG. 9 depicts a state of the system in accordance with one or more embodiments of the invention.

Now referring to FIG. 9, the Server1 and Server2 are shown after performing the back migration for the temporary migration. During the back migration process, the HPT of server2 are analyzed and those pages that have been modified during the migration and update process are identified and transmitted to the source Server1. The modified pages from the Server2 are combined with the pages that are maintained in the source Server1 to provide a complete instance of the updated LPAR. As shown, Server2 has released the resources that were used to track the updates for the temporary migration. During the migration process, each of the VMs remains online so that no downtime is experienced.

Figure 10:
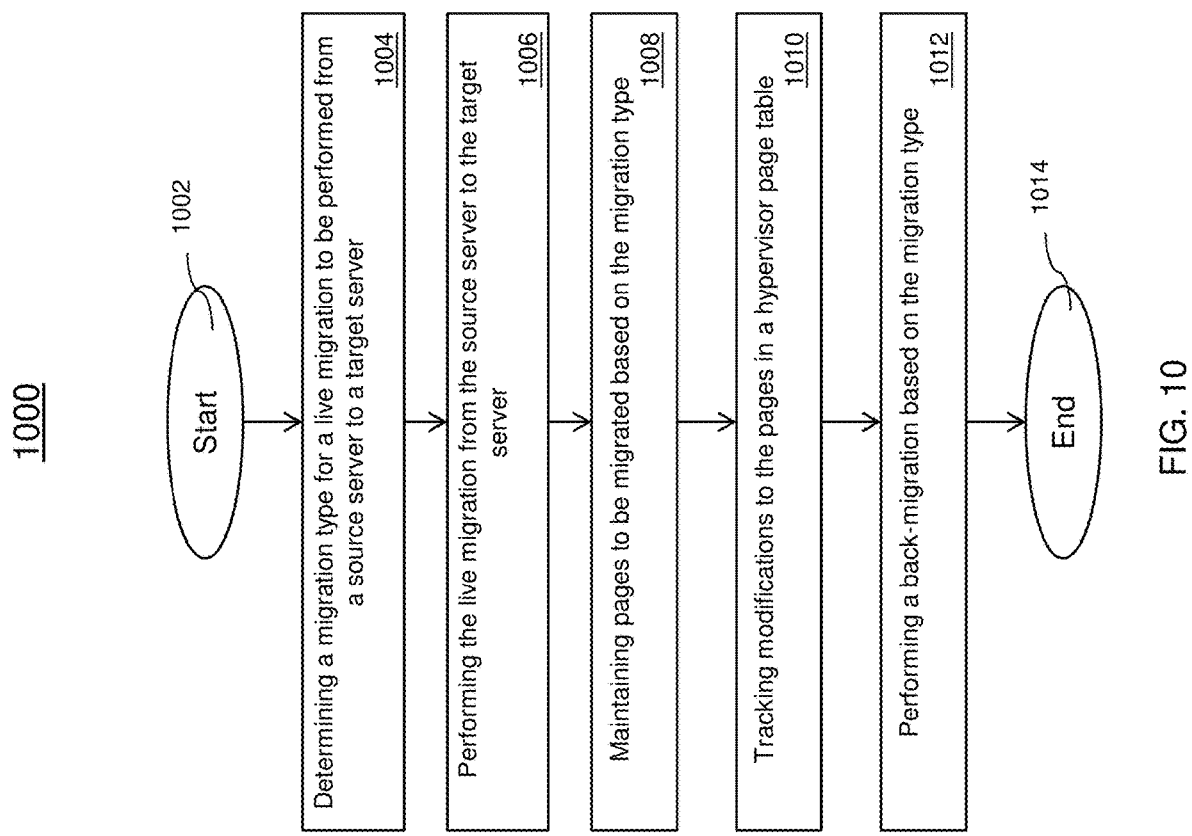
FIG. 10 depicts a flowchart of a method for performing a migration in accordance with one or more embodiments of the invention.

Now referring to FIG. 10, a flowchart of a method 1000 for performing a migration in accordance with one or more embodiments of the invention is provided. The method 1000 begins at block 1002 and proceeds to block 1004 which provides for determining a migration type for a live migration to be performed from a source server to a target server. In one or more embodiments of the invention, the operating system initiates a live partition migration. The mobility process transfers the system environment that includes the processor state, memory, attached virtual devices, and connected users to another partition or another server.

Next, the operating system indicates whether the migration is either a temporary migration or a permanent migration. If the migration is determined to be a temporary migration, the source server maintains the state. If the migration is determined to be a permanent migration, the source server will invalidate the state information and free up the resources upon migration. It should be understood that other types can be considered within the scope of the invention.

The source hypervisor/MSP determines the migration type is temporary. The source hypervisor/MSP informs the destination-side hypervisor/MSP that the migration-type is a temporary type migration.

Block 1006 performs the live migration from the source server to the target server, and block 1008 maintains pages to be migrated based on the migration type. In one or more embodiments of the invention, if the migration type is a permanent migration type the hypervisor page table for the migrated virtual machine or virtual server is freed for usage. If the migration type is a temporary migration type where the virtual server or virtual machine will be back-migrated to the source server, the hypervisor page table and state information are maintained. In other words, the page table and state information are stored and will be used during the back migration process.

Block 1010 tracks modifications in a hypervisor page table. In one or more embodiments of the invention, a copy of the original hypervisor page table is stored in the target server. This hypervisor page table includes an additional bit (MAM bit) to track dirty pages or pages that have been updated during the migration process. The server maintains a copy of the pages as they are received in an original hypervisor page table. The original hypervisor page table tracks the modified pages during the migration.

After the migration process has been completed, a surrogate LPAR will be used to store updates for the kernel update process. During the kernel update, a surrogate page table is used to track changed during the LKU. Similar to the original HPT, the surrogate page table uses the MAM to track the pages that have been changed during the LKU.

Block 1012 performs a back-migration based on the migration type. In one or more embodiments of the invention, a back migration is performed when the migration type is a temporary migration. Only the pages that have been modified during the live migration process and the live update process are transmitted back to the source server. In other words, those pages that are indicated as having been updated by the MAM bit in the hypervisor page table are sent back to the source server. This improves the overall migration time because all of the pages, regardless of having been updated or not, are no longer required to transmitted back to the source to complete the temporary migration.

After performing the LKU, the surrogate HPT is ready for back migration. A processor creates a list of pages to be migrated by adding only those pages that have the MAM bits set. The LPM back migration to server1 only transfers the modified pages. In one or more embodiments of the invention, the modified pages, which are indicated by the MAM bit, are merged with the preserved pages to complete the migration process. At block 1014, the method 1000 ends. It should be understood the method 1000 is not limited to the steps displayed in FIG. 10 but a different sequence or different steps can be used.

The techniques described herein improve the live migration by maintaining page memory, tracking the changes of the memory, and transmitting only the changed pages to the hypervisor to complete the temporary migration.

The technical effects and benefits include improving overall live update operation time by reducing the LPM time. The hypervisor and the MSP (mover service partition) transfer only the page that has been modified.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing live updates, the method comprising:
    determining a migration type for a live migration to be performed from a source server to a target server;
    performing the live migration from the source server to the target server;
    based on the migration type, maintaining pages to be migrated;
    tracking modifications in a hypervisor page table; and
    performing a back-migration based on the migration type, wherein tracking the modifications comprises using a modification-after-migration (MAM) bit to indicate pages that have been modified.

2. The computer-implemented method of claim 1, further comprising tracking modifications during the live migration in a hypervisor table of the target server.

3. The computer-implemented method of claim 2, further comprising tracking modifications occurring after the live migration is completed in a second hypervisor table of the target server.

4. The computer-implemented method of claim 1, further comprising determining whether the migration type is a permanent migration or a temporary migration.

5. The computer-implemented method of claim 4, responsive to determining the migration type is a permanent migration, freeing page memory of the source server associated with the permanent migration.

6. The computer-implemented method of claim 1, wherein the back-migration only transmits changes in the hypervisor table indicated by the MAM bit, wherein the changes are combined with the pages that are maintained in the source server.

7. A system, comprising:
    one or more processors; and
    at least one memory coupled to the one or more processors, wherein the one or more processors are configured to:

determine a migration type for a live migration to be performed from a source server to a target server;

perform the live migration from the source server to the target server;

based on the migration type, maintain pages to be migrated;

track modifications in a hypervisor page table; and perform a back-migration based on the migration type, wherein tracking the modifications comprises using a modification-after-migration (MAM) bit to indicate pages that have been modified.

8. The system of claim 7, wherein the one or more processors are configured to track modifications during the live migration in a hypervisor table of the target server.

9. The system of claim 8, wherein the one or more processors are configured to track modifications occurring after the live migration is completed in a second hypervisor table of the target server.

10. The system of claim 7, wherein the one or more processors are configured to determine whether the migration type is a permanent migration or a temporary migration.

11. The system of claim 10, responsive to determining the migration type is a permanent migration, the one or more processors are configured to free page memory of the source server associated with the permanent migration.

12. The system of claim 7, wherein the back-migration only transmits changes in the hypervisor table indicated by the MAM bit, wherein the changes are combined with the pages that are maintained in the source server.

13. A computer program product for performing live updates, the computer program product comprising:

a computer-readable storage medium having stored thereon program instructions executable by a processor to cause the processor to:

determine a migration type for a live migration to be performed from a source server to a target server;

perform the live migration from the source server to the target server;

based on the migration type, maintain pages to be migrated;

tracking modifications in a hypervisor page table; and perform a back-migration based on the migration type, wherein tracking the modifications uses a modification-after-migration (MAM) bit to indicate pages that have been modified.

14. The computer program product of claim 13, wherein the instructions are further executable by the processor to cause the processor to track modifications during the live migration in a hypervisor table of the target server.

15. The computer program product of claim 14, wherein the instructions are further executable by the processor to cause the processor to track modifications occurring after the live migration is completed in a second hypervisor table of the target server.

16. The computer program product of claim 13, wherein the instructions are further executable by the processor to cause the processor to determine whether the migration type is a permanent migration or a temporary migration.

17. The computer program product of claim 14, wherein the instructions are further executable by the processor to cause the processor to responsive to determining the migration type is a permanent migration, free page memory of the source server associated with the permanent migration.

18. The computer program product of claim 13, wherein the back-migration only transmits changes in the hypervisor table indicated by the MAM bit, wherein the changes are combined with the pages that are maintained in the source server.

* * * * *